Jan. 6, 1948.  G. T. RANDOL  2,434,051
PRESELECTIVE POWER DRIVE CONTROL SYSTEM
Filed April 14, 1945  5 Sheets-Sheet 1

Fig.1.

INVENTOR:
GLENN T. RANDOL,
BY P. N. Lamphere
ATTORNEY.

Jan. 6, 1948.  G. T. RANDOL  2,434,051
PRESELECTIVE POWER DRIVE CONTROL SYSTEM
Filed April 14, 1945  5 Sheets-Sheet 5

INVENTOR:
GLENN T. RANDOL,
BY P. H. Lamphere
ATTORNEY.

Patented Jan. 6, 1948

2,434,051

UNITED STATES PATENT OFFICE 2,434,051

PRESELECTIVE POWER DRIVE CONTROL SYSTEM

Glenn T. Randol, Muncie, Ind.

Application April 14, 1945, Serial No. 588,394

14 Claims. (Cl. 74—334)

This invention relates to preselective power drive control systems and particularly that type of a control system associated with a change speed transmission of a motor vehicle.

One of the objects of this invention is to produce improved control mechanism whereby an operator can preselect neutral or a speed ratio of a variable speed transmission at any time regardless of the condition of the transmission and subsequently obtain the selected condition at will.

A further object is to provide improved means for accomplishing the preselection and the subsequent obtaining of the preselected transmission condition.

A more specific object is to provide recessed concentric sleeves and cooperating spring pressed plungers for selectively connecting shiftable elements to actuating means for the shiftable elements.

Another object is to provide an improved preselecting and shifting mechanism which will permit a greater number of transmission conditions to be preselected and established without an increase in the number of parts or their over size in comparison with similar prior mechanisms.

Still another object is to produce an improved preselecting mechanism for a change speed transmission which will permit transmission condition selection by rotation of a member through shorter arcs of movement.

Yet another object is to produce a preselecting and shifting mechanism for a change speed transmission which is efficient in operation, simple in arrangement of parts and can be manufactured cheaply from available stock material by a minimum of easily performed operations.

Other objects of the invention will become apparent from the following description taken in connection with the accompanying drawings in which.

Referring to the drawings in detail, there is disclosed a gear housing 1 in which is mounted a change speed gearing which may be any type desired having shiftable element such as gears and clutches for obtaining different speed ratios in a well known manner. For the purpose of the present disclosure, however, the change speed gearing is assumed to have three forward speed ratios, a reverse speed ratio and a neutral condition in which none of the speed ratios are operative. This gearing can take the form of what is known as a standard three speed and reverse gearing in which one shiftable element, such as a gear, is employed to obtain low and reverse speed ratios and another shiftable element, such as a combined gear and clutch element, is employed to obtain second and high speed ratios, such an element being shown in Figure 3 and indicated by the numeral 2. This combined gear and clutch element 2, when in the position shown, directly connects the driving shaft 3 to the driven shaft 4 to obtain the high speed ratio. When moved rearwardly through a neutral position the gear teeth of the element will engage a counter-shaft gear to obtain second speed ratio. Since the particular gearing is not involved in the invention it is believed unnecessary to further illustrate or describe it.

The gearing housing has an opening on one side and associated with this opening is a cover plate 5 having a lid 6. The cover plate is secured to the housing by bolts 7 and bolts 8 hold the lid in place on the cover plate.

Figure 3:
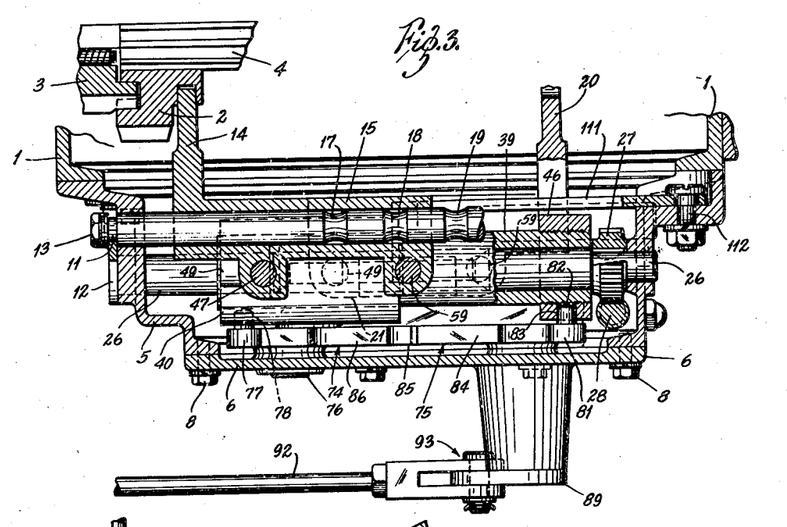
Figures 3, 4 and 5 are sectional views taken on lines 3—3, 4—4 and 5—5 of Figure 2, with Figure 3 showing, in addition, parts of the gearing for establishing high speed ratio.
Figures 5, 6:
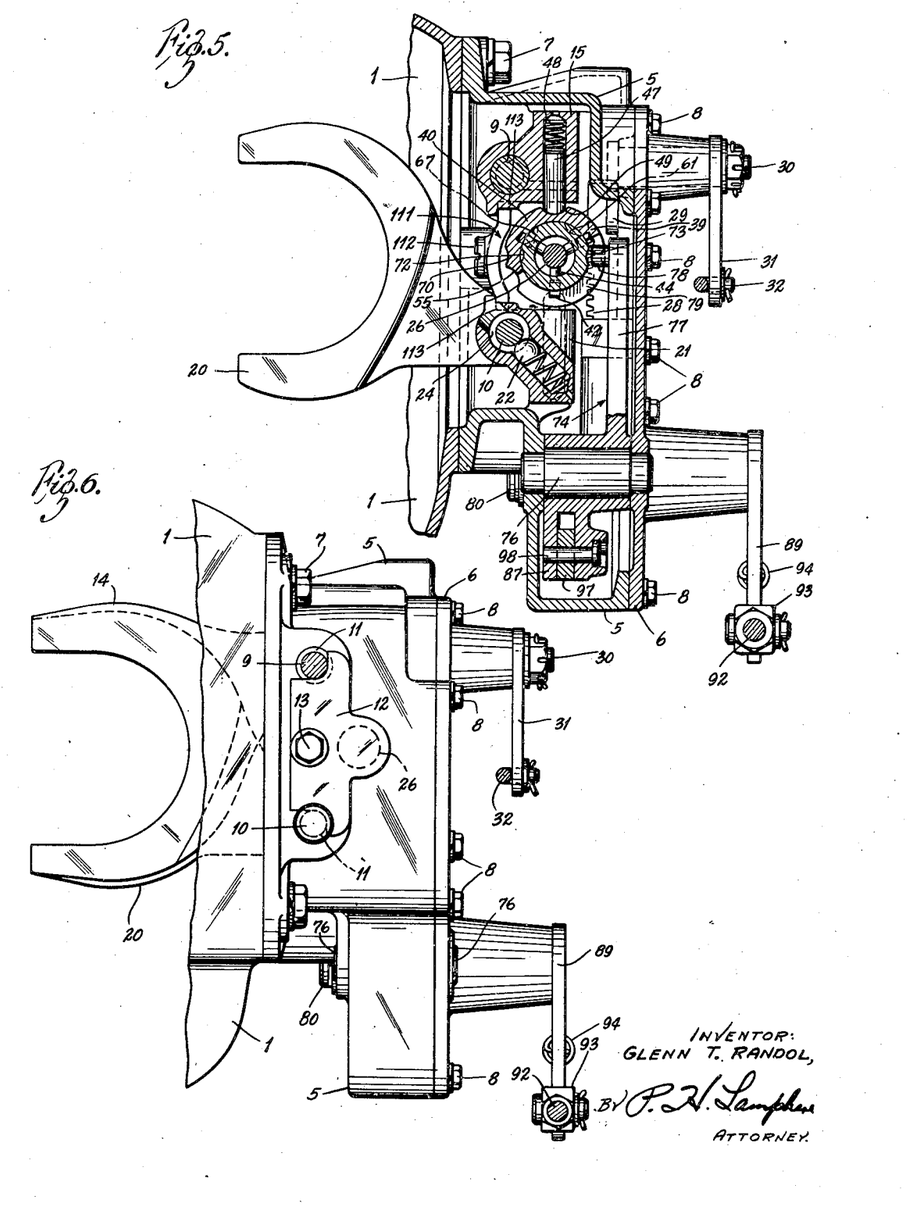
Figure 6 is a front end view of the gearing housing cover plate in which the mechanism is mounted.

Within the cover plate are mounted spaced parallel rods 9 and 10 which extend longitudinally and are supported in the end walls of the cover plate. The forward ends of the rods project beyond the outer end surface of the cover plate and are provided with grooves 11 with which is associated a locking plate 12 detachably secured to the cover plate by a bolt 13, all as best shown in Figures 3 and 6. By this arrangement the rods are securely held within the cover plate, but yet may be readily removed by removal of the locking plate.

Figure 4:
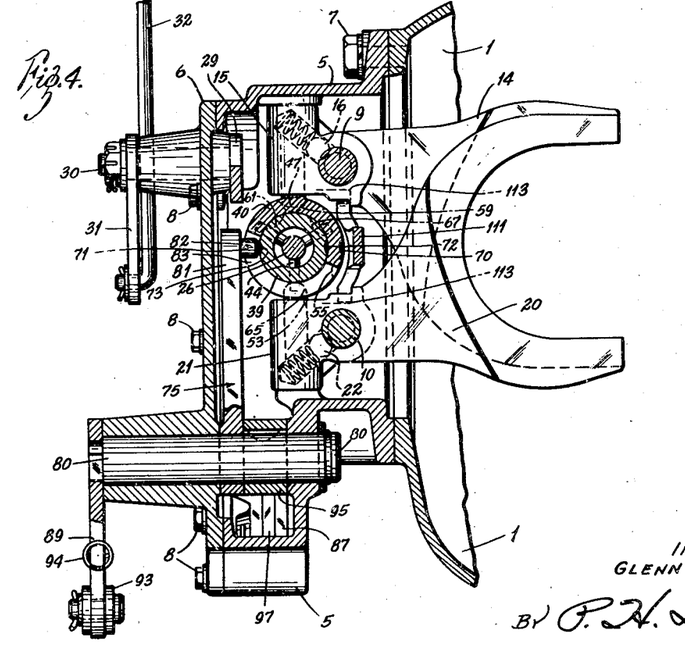

The rod 9 has slidably mounted thereon a gear shifting fork 14 which is associated with the slidable combined clutch and gear element 2 for moving it to three positions, namely, neutral, second speed ratio and high speed ratio. The body 15 of the shifting fork carries a spring pressed ball detent 16 (see Figure 4) for cooperation with any of three annular grooves 17, 18 and 19 in the rod 9, which grooves are so spaced as to correspond with the three positions of the gear shifting fork. With this arrangement the shifting fork can be yieldably held in its three positions. The body 15 of the shifting fork extends upwardly and is arranged to engage the side wall of the cover plate to provide guiding support to the gear shifting fork as it slides on the rod.

The rod 10 is similar to the rod 9 and it has slidably mounted thereon a gear shifting fork 20 for controlling the gearing shiftable element to obtain the low and reverse speed ratios. This element, which is not shown, has three positions, namely, neutral, low and reverse, the neutral position lying between the low and reverse positions. The body 21 of the shifting fork carries a spring pressed ball detent 22 for cooperation with any of three annular recesses 23, 24 and 25 in the rod which recesses correspond to the three positions of the shifting fork. With this construction the shifting fork will be yieldably held in its three positions. The body 21 of the fork extends upwardly and slidably engages the adjacent side wall of the cover plate for guiding support in a manner similar to that of the other shifting fork 14.

Between the two rods 9 and 10 is positioned a shaft 26 which is parallel with the rods, but in a plane outwardly from the plane of the rods. This shaft has its ends journaled in the end walls of the housing and has keyed to its end adjacent the rear wall a gear 27. This gear and the previously mentioned locking plate 12 at the forward end of the cover plate hold the shaft from axial movement. The gear 27 on the shaft has meshing therewith a rack 28 which is positioned at right angles to the axis of the shaft and mounted for sliding movement in a suitable boss carried by the lower side of the cover plate. The upper end of the rack is notched and received in the notch is the free end of an arm 29 which is secured to the inner end of a shaft 30 journaled in the lid 6 of the cover plate. On the outer end of this shaft is secured an arm 31 which has its free end connected by a link 32 with an operator controlled mechanism. This control mechanism comprises a shaft 33 journaled in parallel relation on the steering column 34. The lower end of this shaft carries an arm 35 to which the rod 32 is connected. The upper end of the shaft 33 is controlled by a gear shifting lever or handle 36. Associated with this handle is an indicator plate 37 having the indicia "R," "N," "L," "S" and "H" thereon to indicate the various conditions of the gearing. The upper end of the shaft 33 has secured thereto a pointer 38 which cooperates with the indicia so that the operator will know what condition of the gearing has been selected.

Figures 7, 8, 9, 10:
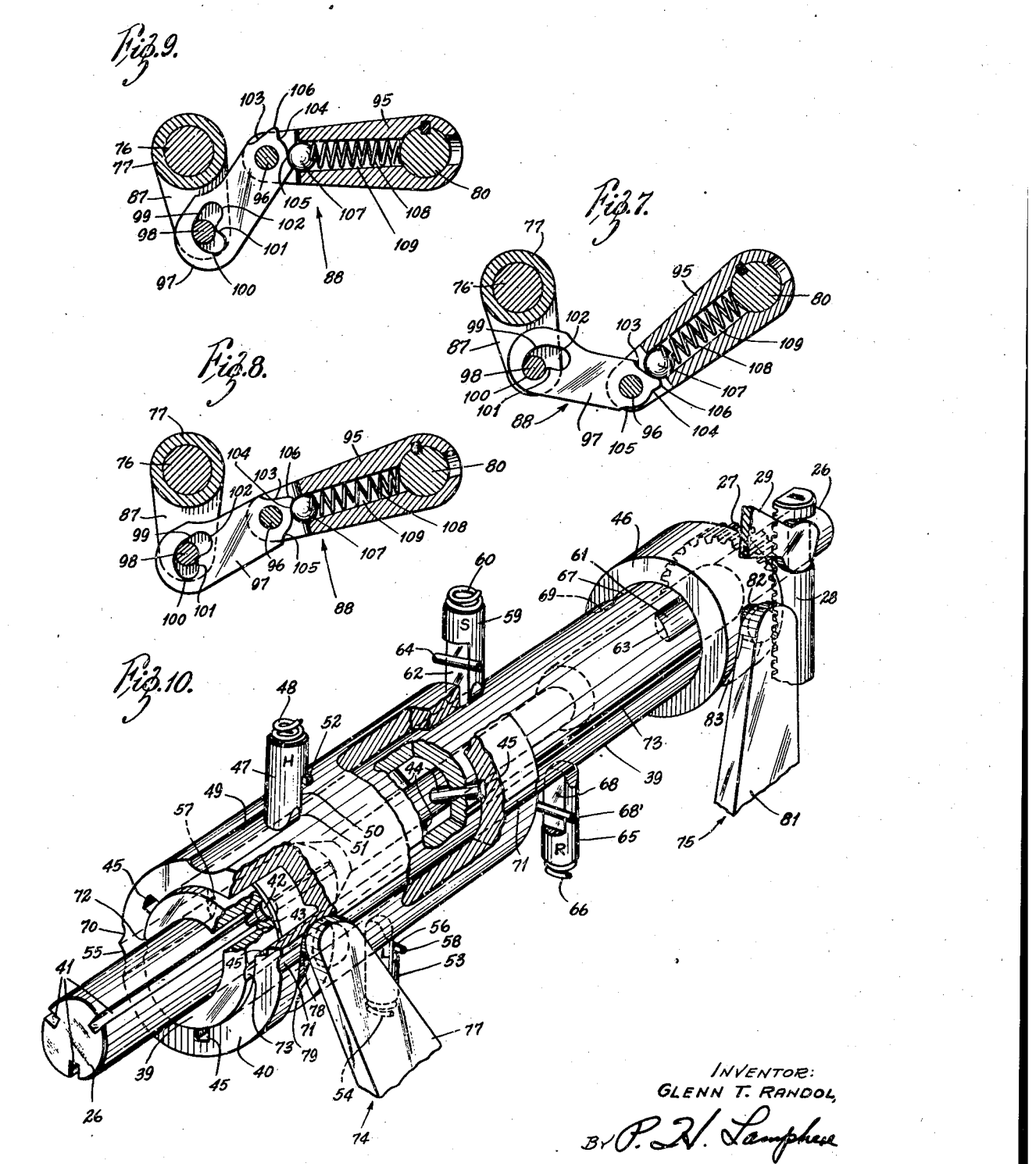
Figures 7, 8 and 9 are sectional views of the toggle mechanism showing different positions assumed by its parts during operation of the control mechanism.
Figure 10 is a perspective view of the preselecting and shifting sleeves together with associated parts, including the plungers.

As best shown in Figure 10 the shaft 26 has slidably mounted thereon and rotatably therewith two concentric sleeves the inner sleeve 39 of which is longer than the outer sleeve 40. The forward end of the shaft 26 is provided with longitudinally extending key ways 41 and the inner sleeve 39 carries inwardly extending pins 42 which engage in the key ways, thus providing such connection between the shaft and the inner sleeve as to permit the sleeve to slide axially on the shaft and yet be rotatable in unison therewith. The pins 42 are held in the sleeve by a circular spring 43 positioned in an annular groove. The outer sleeve 40 is substantially about half the length of the inner sleeve and in order that this sleeve may be rotatable in unison with the shaft and the inner sleeve, the inner sleeve is provided with three radially extending pins 44, the outer ends of which project into longitudinally extending key ways 45 in the inner surface of the said outer sleeve. The central part of the shaft 26 is reduced in diameter and these pins 44 are arranged to project inwardly and ride on this reduced portion of the shaft. The purpose of this construction is to reduce the area of surfaces in engagement between the inner sleeve and the shaft and thereby permit freer sliding movement of the inner sleeve on the shaft. The pins 44, by engaging the reduced portion of the shaft, also aid in giving support to the sleeves over the central part of the shaft. The rear end of the inner sleeve carries a collar 46 threaded thereon and which has a thickness substantially the same as the outer concentric sleeve 40.

Figure 1:
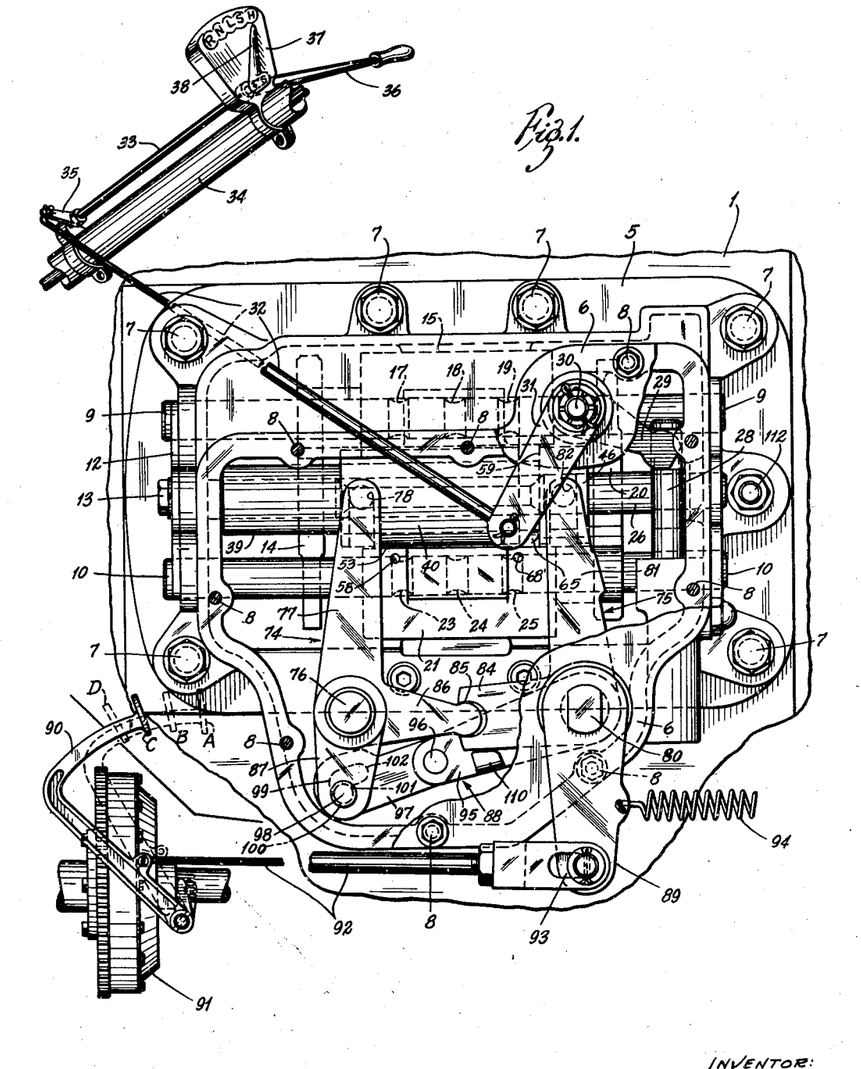
Figure 1 is a side view of a change speed transmission housing showing preselecting and shifting mechanism embodying my invention associated therewith, portions of the lid for the cover plate being broken away and the parts of the mechanism being shown in positions corresponding to neutral condition of the gearing with high speed ratio preselected and the actuating clutch pedal in a clutch disengaged position ready to operate the mechanism to accomplish a shift.

Both shifting forks are arranged to be selectively connected to the inner and the outer sleeves for axial movement therewith. The structure for connecting the shifting fork 14 to the outer sleeve 40 comprises a plunger 47 carried by the body 15 of said shifting fork. This plunger is arranged to reciprocate in the body of the shifting fork at right angles to the axis of the sleeve and a spring 48 in back of the plunger normally biases the outer end of the plunger into engagement with the surface of the sleeve. The sleeve is provided in its surface with a recess 49 for receiving this plunger when the recess is positioned opposite the end of the plunger. The plunger has a flat surface 50 on one side thereof which is arranged to be engaged by the shoulder 51 at the inner end of the recess 49. A pin 52 cooperating with a portion of the flat surface 50 on the pin prevents rotation of the plunger. With this arrangement it is seen that if the outer sleeve 40 is moved to the left from its innermost position, as shown in Figure 1, and while the plunger is received in the recess, the shifting fork will be so connected to the sleeve that it will be moved axially with the sleeve and as a result thereof the high or third speed ratio can be established. The plunger 47 is also indicated by the letter "H" to show it is the plunger which must be operative in establishing high speed ratio.

In a similar manner the outer sleeve 40 and the shifting fork 20 can be connected together so that when the sleeve is moved outwardly from its inward position shown in Figure 1 the shifting fork 20 will be moved therewith. The body of the shifting fork 20 carries a plunger 53 positioned in the body of the shifting fork to reciprocate at right angles to the axis of the sleeve. The plunger is backed by a spring 54 which normally biases the plunger against the surface of the sleeve. The surface of the sleeve has a recess 55 which is arranged to be substantially 120 degrees in a counter-clockwise direction from the recess 49 when viewed from the forward end of the sleeve.

The plunger is provided with a flat surface 56 for engagement with the shoulder 57 at the inner end of the recess when the plunger is in said recess. The plunger is held from turning by a pin 58 cooperating with the flat surface 56. With this arrangement it is seen that when the outer sleeve is moved outwardly from its innermost position shown in Figure 1, and while the plunger is in the recess 55, the shifting fork 20 will be so connected therewith that the shifting fork will move forwardly with the sleeve thus establishing low speed ratio. The plunger 53 is also indicated by the letter "L" in Figure 10 to show it is the plunger which must be operative when low speed ratio is established. It will be noted that by the arrangement of the recesses 49 and 55 only one shifting fork can be connected at a time to the sleeve 40 for movement therewith. When one plunger is in a recess the other plunger will ride on the outer surface of the sleeve as the sleeve is being moved axially relative thereto.

The structure employed to bring about the selective connection of the shifting forks to the inner sleeve 39 also comprises similar but longer plungers carried by the shifting forks and recesses in the sleeve. The body of the shifting fork 14 carries a second plunger 59 backed by a spring 60 for biasing it into engagement with the surface of the inner sleeve 39. The inner sleeve has a recess 61 adjacent the collar 46 at its rear end for receiving the plunger 59. The plunger has a flat surface 62 at one side thereof for cooperation with the shoulder 63 of the recess 61. Thus when the plunger is in the recess there will be such a connection between the shifting fork 14 and the inner sleeve that when the inner sleeve is moved from its inner position shown in Figure 1 to its outer position, the shifting fork 14 will be moved axially therewith to establish second speed ratio. The plunger 59 in Figure 10 is also indicated by the letter "S" to show it is the plunger which must be operative to establish the second speed ratio. A pin 64 cooperates with a portion of the flat surface on the plunger to prevent its turning. The circumferential position of the recess 61 is such that it lies between the recesses 49 and 55 of the outer sleeve whereby, when the plunger 59 is in the recess 61, it will be impossible for the other plungers 47 and 53 to be in their recesses.

On the body of the fork 20 there is also a second plunger 65 backed by a spring 66 and arranged to reciprocate at right angles to the surface of the inner sleeve. The end of the inner sleeve adjacent the collar 46 has a second recess 67 into which the plunger 65 can be received. The plunger 65 has a flat surface 68 for engagement with the end shoulder 69 of the recess. When the plunger 65 is in the recess 67 and the sleeve is at its innermost position, as shown in Figure 1, the inner sleeve will be connected to the shifting fork 30 so that when the sleeve is moved outwardly to the position shown in Figure 2 the shifting fork will be carried with the sleeve and reverse speed ratio established. The plunger 65 in Figure 10 is also indicated by the letter "R" to show that it is the one which must be operative to establish reverse speed ratio. A pin 68' cooperates with a portion of the flat surface on the plunger to prevent the plunger from turning. The recess 67 is so arranged circumferentially on the surface of the sleeve 39 as to be approximately 90 degrees from the recess 61 of said sleeve, such angular distance being in a clockwise direction as viewed from the forward end of the sleeve. This will place the recess 61 so that it is in a clockwise direction beyond the recess 49 in the outer sleeve, thus it will be impossible for any of the other plungers to be in their recesses when the plunger 65 is in the recess 67.

When the inner and outer concentric sleeves are in their innermost position, as indicated in Figure 1, the various recesses will assume positions where they will be in planes to receive their cooperating plungers. Thus by a rotation of the shaft 26, which will simultaneously rotate the sleeves, any recesses can be brought to a position where it will receive its cooperating plunger. The mechanism already described for rotating the shaft 26 and the sleeves is so coordinated with the recesses that whenever the hand lever is set so that the pointer 38 is opposite the indicia "R" the sleeves will be given such a rotation that the "R" plunger 65 can be received in the recess 67, provided the recess is in the same plane as the plunger. If the recess 67 is not in the plane, due to the fact that the sleeve is in its outermost position, the recess, nevertheless, will be so positioned that when brought into the same plane as the "R" plunger, the plunger can be received therein. Similarly, when the pointer indicates "L" the recess 55 will be so positioned that it can receive the plunger "L" whenever the outer sleeve is in its innermost position. When the pointer is indicating "S," the "S" plunger can be received into the recess 61 if the inner sleeve is in its innermost position. If the pointer indicates the "H" position, then the "H" plunger can drop into the recess 49 in the outer sleeve. If the pointer is indicating "N," then the sleeves will be so positioned that none of the recesses 49, 55, 61 and 67 will be capable of receiving their cooperating plungers and, therefore, there can be no connection between the sleeves and the shifting forks so as to bring about an axial movement of the shifting forks whenever the sleeves are moved outwardly from their innermost position. In order that there will be a definite indication to the operator that the pointer is at the "N" position, the outer sleeve is provided with diametrically positioned axially extending shallow grooves 70 and 71 for cooperation with the "H" and "L" plungers and the inner sleeve is provided with similarly positioned diametrically positioned axially extending shallow recesses 72 and 73 for cooperation with the "S" and "R" plungers. These shallow recesses extend the entire length of the sleeves so that regardless of the axial position of the sleeves the "N" indication will be present.

The plungers 59 and 65 are also employed for bringing the shifting forks back to their central neutral positions, in addition to moving said shifting forks to their rearmost positions to establish second and reverse speed ratios. It will be noted that because the plungers 59 and 65 ride on the inner sleeve they will always be between the inner end of the outer sleeve 40 and the collar 46 at the rear end of the inner sleeve 39. Thus, if a shifting fork is in other than its central neutral position as a result of being moved by an outward movement of the two sleeves, then regardless of the selective angular positions which the sleeves may assume, the end of the outer sleeve or the collar will always engage plunger 59 or 60, depending upon which fork is moved from its central position, and bring the shifting fork in which it is mounted back to the central position when the sleeves are moved to their innermost position as shown in Figure 1.

A mechanism is employed to axially move the two concentric sleeves to their innermost and outermost positions in order to bring about the shifting of the shifting forks which may be selectively connected thereto to thus establish the various speed ratios. Pivotally mounted on the cover plate beneath the rod 10 are companion levers, generally indicated by the numerals 74 and 75. Lever 74 is pivotally mounted on a pivot pin 76 and has an arm 77 carrying on its free end a pin 78 which projects into an arcuate groove 79 in the forward end of the outer sleeve 40. The arcuate slot is of sufficient length to permit such rotation of both sleeves and the shaft 26 that all of the various recesses in the two sleeves can be presented for receiving their cooperating plungers. The other companion lever 75 is pivotally mounted on a shaft 80 journaled in the cover plate and a boss on the cover plate lid. This lever has an arm 81 which carries on its free end a pin 82 which projects into an arcuate groove 83 in the collar 46 carried by the rear end of the inner sleeve 39. This groove is also of sufficient length to permit the rotation of the sleeves and shaft 26 to bring about reception of the plungers in their recesses.

The lever 75 also has a short arm 84 which is connected by ball and socket type of joint 85 with an arm 86 that extends from the other companion lever 74. Thus by means of this interconnection of the companion levers the arms 77 and 80 can be caused to be simultaneously moved toward and away from each other to also so move the sleeves. In order to bring about the movement of these companion levers, the lever 74 has a third arm 87 extending in the opposite direction from the arm 77. This arm 87 is connected by a toggle mechanism, generally indicated by the numeral 88, with the previously referred to shaft 80 upon which the companion lever 75 is pivoted. Through this toggle mechanism the companion levers are caused to move towards and away from each other at will by a rotation of the shaft 80 in one direction only. No movement of the levers will take place during the return rotation of shaft 80.

Figures 2, 11, 12:
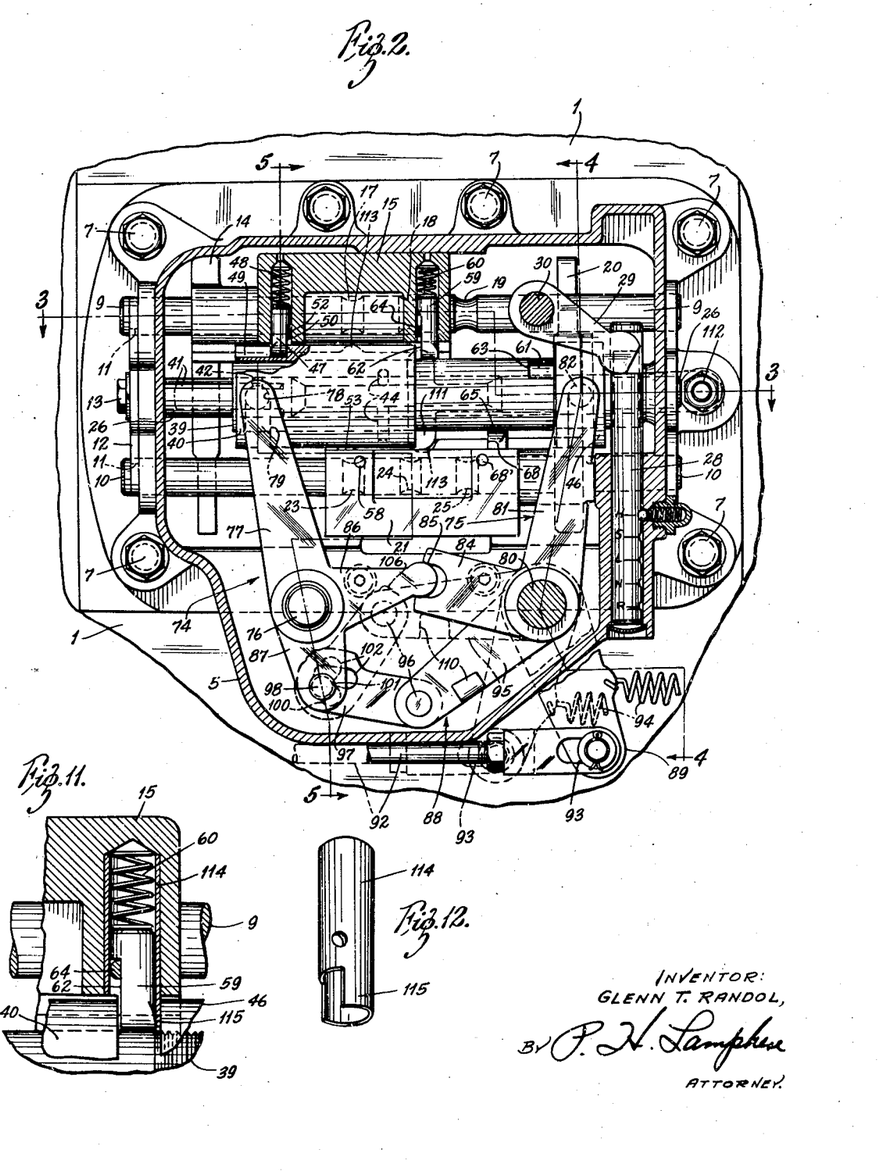
Figure 2 is a view similar to Figure 1 but showing certain part in section and the mechanism positioned to establish high speed ratio.
Figure 11 is an enlarged sectional view of a modified plunger mounting on one of the shifting forks.
Figure 12 is a perspective view of the bushing or tube in which the plunger of Figure 11 slides.

Shaft 80 on its outer end carries an arm 89 and this arm is shown, by way of example, as arranged to be actuated by the usual clutch pedal 90 for the main friction clutch 91, shown in decreased scale in Figure 1, and positioned between the engine of the vehicle and the driving shaft of the change speed transmission, all of which is standard practice. The connection between the clutch pedal and arm 89 comprises a link 92 and a lost motion connection 93 between said link and the arm 89. This lost motion connection 93 is present to permit disengagement of the main clutch prior to any movement of the arm 89. The arm 89 is normally biased to its rearmost position by a fairly strong spring 94, said rearmost position being best illustrated in the full line position in Figure 2. When in this position the companion levers will be in their spread apart condition also as indicated in Figure 2. The clutch pedal is indicated as having four different positions shown by the letters "A," "B," "C" and "D" in Figure 1, the positions "A," "B" and "D" being shown in dotted lines. The position "A" corresponds to that assumed by the clutch pedal when the clutch is fully engaged. Under these conditions the lost motion connection between the rod 92 and the arm 89 will be such that there can be free movement of the clutch pedal to the position "B" to disengage the main clutch without any movement of the arm 89 and an actuation of the mechanism, including the companion levers and the sleeves. The position "C" of the clutch pedal, shown in full lines, will correspond to a condition where the companion levers and sleeve have been moved to their innermost position, all as indicated in Figure 1. The position "D," which is beyond the position "C," corresponds to a condition wherein the companion levers and the sleeves are again spread apart to assume the positions shown in Figure 2. This spreading apart of the companion levers, after being moved to their innermost positions, is brought about by the particular toggle mechanism 88, already generally referred to and now to be described in detail.

The toggle mechanism comprises an arm 95 which is secured to the shaft 80 for rotation therewith. To the outer end of this arm 95 is pivotally connected, by a pin 96, a link 97 for connecting the arm 95 with the previously referred to third arm 87 of the companion lever 74. The connection between the link 97 and the arm 87 is made by a pin 98 carried by the arm and an L-shaped slot 99 in the link and into which the pin 98 extends. The pin 98 is of such diameter as to substantially fill the width of the slot. The slot is so made in the link and so positioned with respect to the pivot pin 96 and its connection with the arm 95, that the leg 100 of the slot will present a shoulder 101 for engaging the pin 98 whenever the shaft 80 and the arm 95 are in positions corresponding to the "A" and "B" positions of the clutch pedal, that is, the rearmost position of the arm 87 by which shaft 80 is actuated. The other leg 102 of the L-shaped slot is arranged to receive the pin only during the return movement of the arm 95 and the shaft 80 after they have been fully rotated by depressing the clutch pedal to the position "D." When this leg so receives the pin there can thus be no actuation of the companion levers 74 and 75 during the return movement of the arm 95 and the shaft 80. The end of the link which is pivoted to the arm 95 has recesses 103, 104 and 105. The recesses 103 and 104 are separated by a prominent peak 106. Cooperating with the recesses is a spring biased detent comprising a ball 107 and a spring 108, both positioned in a bore 109 of the arm 95. The detent, together with the cooperating recesses and peak, insures that the link will be maintained in its desired position during the operation of the toggle mechanism. The arm 95 also carries a lug 110 for co-acting with the arm 84 of the companion lever 75, it being noted that the arms 84 and 95 swing in planes which are parallel with each other. This lug has for its purpose the assisting of the operation of the companion levers when they are swung away from each other after first being brought to their innermost positions by a functioning of the toggle mechanism, all as will become apparent from the description of the operation.

Referring now to the operation of the improved preselecting and shifting mechanism, let it first be assumed that the engine of the vehicle is running and the vehicle is standing still with the clutch pedal depressed to the position "B," thereby disengaging the main clutch. The shifting mechanism, under such conditions, will not be changed from the position shown in Figure 2 since this movement of the clutch pedal will only take up the lost motion in the connection between the rod 92 and the arm 89, also illustrated in full lines in Figure 2. This normal position of the companion levers will result in the sleeves being in their outermost position. Let it also be assumed that during this starting of the engine the shifting forks are in their central neutral positions and the gear shifting lever has been in a position where the pointer indicates the "N" or neutral condition of the gear where it should have been placed when the vehicle was stopped. Under such position of the gear shifting lever the plungers will be riding in the shallow recesses 70, 71, 72 and 73 and none of them will be so related to the two sleeves that they can drop into their cooperating recesses to permit any connection of a sleeve with a gear shifting fork to bring about a shift, even though the companion levers and the sleeves should be moved inwardly and outwardly.

Let it next be assumed that it is desired to start the vehicle forward in low speed ratio with the clutch pedal still positioned at "B." The gear shifting lever is then moved so that the pointer indicates "L." This will so rotate the sleeves that the recess 55 in the outer sleeve 40 will be placed in axial alignment with the plunger "L." This plunger, however, cannot enter its recess because of the fact that the sleeves are at their outermost position and the gear shifting fork which carries the plunger is in its center position. With this setting of the gear shifting lever the clutch pedal is now fully depressed to the position "D." When the clutch pedal is moved from the position "B" to the position "C" it will rotate the arm 89 of the shaft 80 and the arm 95 in a clockwise direction as viewed in Figure 2. Before this movement the parts of the toggle mechanism, including the link 97 and arm 95, will be in the position shown in full lines in Figure 2 and in the detail view of Figure 7. The pin 98 is in the leg 100 of the slot where it is being maintained by the action of the spring biased ball 107 acting at the recess 103. This condition of the toggle mechanism will insure that the shoulder 101 will be in engagement with the pin 98 on the arm 87 of the companion lever 74. Now as the arm 95 is moved in a clockwise direction (by movement of the clutch pedal from "B" to "C") it will, through the link 97, rotate the arm 87 in a clockwise direction about the pin 76. Such rotation of the arm moves the arm 77 of the companion lever 74 inwardly and since the other companion lever 75 is connected to move oppositely to the companion lever 74 it also will move inwardly. Movement of the arms 77 and 81 of the companion levers will bring the sleeves to their innermost position, which position is indicated in Figure 1.

When this positioning of the sleeves occurs the recess 55 will be placed in the plane of the plunger "L" so that the shifting fork 20 will then be connected to the outer sleeve 40. When the companion levers and sleeves are at their innermost position the link 97 and the arm 95 of the toggle mechanism will be in substantial alignment, as indicated in Figures 1 and 8. The peak 106 will have passed beneath the spring pressed ball and the ball will be received in the shallow recess 104 which will so position the link and its L-shaped slot that the pin 98 will no longer be engaged by the shoulder 101 and the other leg 102 of the slot can receive the pin. It will also be noted that when the toggle mechanism is in the position indicated in Figure 8, resulting from the clutch pedal being moved to the position "C," the lug 110 on the arm 108 will be at a position where it can engage the arm 84 on the companion lever 75, as best illustrated in Figure 1.

Continuing movement of the clutch pedal from the position "C" to the position "D" will now cause the arm 95 to continue its clockwise rotation and because of the lug 110 thereon it will simultaneously rotate the arm 84 therein. This movement of the arm 84 will result in the companion levers 74 and 75 being moved outwardly to their original position, carrying with them the two concentric sleeves. Since shifting fork 20 is now connected to the outer sleeve 40 by the plunger "L," the shifting fork will be carried therewith to its forward position which is that corresponding to the establishment of low speed ratio. The movement of the companion levers to their outermost position is also assisted by the action of the toggle mechanism, the arm 95 pulling on the link 97 during its continued rotation from the position shown in Figure 8 to the position shown in Figure 9. During this movement the pin 98 will stay in the slot approximately midway between the two legs.

With the low speed ratio thus established the clutch pedal will be released and permitted to return to the clutch engaged position "A." During this return movement there will be no movement of the companion levers 74 and 75. As the arm 95 of the toggle mechanism makes its return counter-clockwise movement, the link 97 will straighten out and align with the arm, which movement will be permitted by the leg 102 of the slot which moves downwardly to receive the pin 98. This will permit the arm and a link to move through their aligned position and then return to their original positions shown in Figure 7. These original positions will be assumed when the clutch pedal reaches the position "B." The return of the clutch pedal from the position "B" to the position "A" will only allow re-engagement of the clutch due to the lost motion connection 93. The return of the toggle mechanism from the condition shown in Figure 9 to the condition shown in Figure 7 will be assisted or fully performed by the action of the fairly strong spring 94 which is connected to the lever 87.

If it is now desired to obtain another speed ratio, as for example second speed ratio, the pointer 38 can, if desired, be set in the "S" position before the shift is made. When this is done the concentric sleeves will be so rotated that the plunger "S" will be axially aligned with its recess 61 in the inner sleeve. This rotation of the sleeves will also result in the plunger "L" being moved out of its recess 55 and up onto the surface of the outer sleeve. When the shift is desired to be made from low speed ratio to second speed ratio, all that need be done is move the clutch pedal from position "A" to position "D" and release it. The result will be that the companion levers and the sleeves will be moved inwardly and then outwardly during the movement of the clutch pedal from position "B" to position "D." As the levers and sleeves are moved inwardly the inner end of the outer sleeve will engage the "R" plunger carried by the shifting fork 20 and move the shifting fork back to its central position, thus neutralizing low speed ratio. When the sleeves reach this innermost position the plunger "S" will drop into the recess 61 and connect the inner sleeve 39 to the shifting fork 14. Thus it is seen by this inward movement of the sleeves one shifting fork will be returned to neutral position and another shifting fork picked up. As the sleeves move outwardly to their outer positions the shifting fork 14 will be moved by the inner sleeve to its rearmost position which establishes second speed ratio. As the clutch pedal is released to re-engage the clutch there will be no further movement of the companion levers and sleeves, only a resetting of the toggle mechanism as already described.

If it is now desired to obtain high speed ratio, this is accomplished by setting the pointer to indicate "H." The clutch pedal is depressed when desired from the position "A" to position "C." The clutch will be first disengaged and the companion levers and sleeves first moved inwardly and then outwardly. The setting of the pointer at "H" results in the recess 49 of the outer sleeve 40 being aligned with the plunger "H" and the moving of the plunger "S" out of its recess 61. As the sleeves move inwardly the collar 46 will engage the plunger "S" and move the shifting fork 14 back to its neutral position, thus neutralizing second position. When the innermost position of the sleeves is reached the plunger "H" will drop into the recess 49, thereby connecting the shifting fork 14 to the outer sleeve 40. As the outer sleeve returns to its outermost position the shifting fork will be moved therewith so as to establish high speed ratio, as indicated in Figures 2 and 3. There will be no movement of the sleeves and the companion levers when the clutch is allowed to become re-engaged, but the toggle mechanism will be reset as already described.

It is believed to be obvious as to how reverse speed ratio can be established by merely setting the pointer in the "R" position and then depressing and releasing the clutch pedal. In such instance any forward speed ratio which might be established would be neutralized prior to the reverse speed ratio being established by the connecting of the shifting fork 20 with the inner sleeve and the moving of the shifting fork rearwardly when the inner sleeve moves rearwardly.

In changing from one speed ratio to another, it is not necessary that the speed ratio to be obtained be preselected as the selecting of such speed ratio can be accomplished at the time the gearing is neutralized when the sleeves and the companion levers are moved to their innermost position, shown in Figure 1. As already noted, neutralizing is accomplished by merely moving the clutch pedal to the position "C." When the sleeves are in the innermost position any plunger can be placed in its cooperating recess by the proper setting of the gear shifting lever 36. To accomplish the establishment of the speed ratio selected the clutch pedal is merely moved from the position "C" to the position "D." Thus it is seen that even though one speed ratio may have been preselected the operator can change his mind and select another speed ratio at any time up to the time the sleeves are moved outwardly.

The use of two selecting and shifting sleeves is a very important feature of my invention. With such an arrangement some of the plungers will ride on one sleeve and others will ride on the other sleeve. This permits the recesses for the plungers to be carried by different sleeves. Consequently the recesses can be circumferentially placed close together, even in overlapping relationship. By this is meant that a recess on the one sleeve can be so close circumferentially as to overlap a recess on another sleeve. This permits a minimum of rotation of the shaft 26 and the sleeves to select various speed ratios. Consequently the arcuate throw of the gear shifting lever 36 for obtaining all the speed ratios can be very small. Also this sleeve arrangement permitting overlapping of recesses on different sleeves allows for a greater number of speed ratios to be handled by the mechanism. Although only four speed ratios are shown, it is possible to add several more without changing the construction in any way except for putting additional recesses in the sleeves for cooperation with plungers carried by other gear shifting forks. By viewing Figure 5 it will be noted that the four speeds are all selected by grouping the four recesses over a circumference less than 180 degrees. Consequently there remains additional circumferential space for more recesses on the sleeves and additional shifting forks can thus be controlled by merely adding additional recesses for reception of plungers carried by the additional shifting forks.

It will be noted that the neutralizing of an active speed ratio will always occur whenever the clutch pedal is moved to the position "C" and regardless of the position of the gear shifting lever. If it is desired to leave the transmission in neutral position, this can be accomplished when the gearing is neutralized by merely placing the pointer at the "N" position. None of the plungers will then be capable of engaging a cooperating recess so that a fork can be moved to an operative position as the companion levers and sleeves are returned to their outermost positions. Neutral condition can also be pre-selected by setting the pointer to "N" prior to depressing the clutch pedal. When this is done the clutch pedal need not be held in disengaged position "C" to maintain neutral condition as would be the case when the pointer indicates a speed ratio.

In order that one shifting fork cannot be moved to an operative position while another fork is in an operative position, there is provided an interlocking mechanism for association with the shifting forks. This mechanism comprises a T-shaped arm 111 pivoted by a bolt 112 to the rear of the cover plate and extending forwardly to a position between the two shifting forks. The opposed projections on the head end of the arm so cooperate with recesses 113 in the shifting forks that one will be forced into the recess in one shifting fork when the other shifting fork is moved to an operative position and thereby hold the one shifting fork from movement out of its central neutral position.

In Figures 11 and 12 there is shown a slight modification for the "S" and "R" plungers which are engaged by the end of the outer sleeve and the collar 46 to perform the neutralizing function. The plunger shown for illustration is the "S" plunger 59. The bore for the plunger receives a bushing 114 which is held in position by the pin 64. This bushing is so cut that it has an extending portion 115 which projects to a point adjacent the surface of the inner sleeve 39. Thus it is seen that if the inner end of the outer sleeve 40 engages the plunger 59 to return the shifting fork 14 to neutral position, the plunger will be backed by the extending portion 115 and the bushing will relieve the plunger of the force being transmitted to the shifting fork. In a similar manner when the collar 46 is performing a neutralizing action this collar will directly engage the extending portion 115 of the bushing and the bushing will then take the load instead of the plunger. Thus by this construction there will be no strain on the plungers "S" and "R" which will cause them to become worn and capable of "cocking."

Being aware of the possibility of modifications in the particular preselecting and shifting mechanism shown and described without departing from the fundamental principles of my invention I do not intend that the scope be limited in any manner except in accordance with the appended claims.

What is claimed is:

1. In control mechanism for a change speed transmission having shiftable elements for controlling the speed ratios, concentric sleeves mounted for relative axial sliding movement and simultaneous rotation, means for selectively connecting the shiftable elements to each sleeve by rotation of the sleeves, means for rotating the sleeves, and means for simultaneously sliding the sleeves in opposite directions.

2. In control mechanism for a change speed transmission having shiftable elements for controlling the speed ratios, concentric sleeves mounted for axial sliding movement and simultaneous rotation, the inner of said sleeves extending beyond one end of the outer sleeve in all positions of the sleeves, means for selectively connecting the shiftable elements to each sleeve by rotation of the sleeves when in predetermined axial positions, means for rotating the sleeves, means for simultaneously sliding the sleeves in directions away from each other when in the predetermined positions to thereby move a connected shiftable element, means for simultaneously returning the sleeves to the predetermined positions, and means for returning a moved element regardless of the rotative position of the sleeves.

3. In a control mechanism for a change speed transmission having shiftable elements for controlling the speed ratios, concentric sleeves mounted for relative axial sliding movement and simultaneous rotation, means operable by a rotation of the sleeves to different positions for selectively connecting the shiftable elements to each sleeve when the sleeves are in predetermined axial positions, means for simultaneously moving the sleeves axially in opposite directions from said predetermined position to a second predetermined position to thereby move a shiftable element with a sleeve from one position to another if connected therewith, means for simultaneously returning the sleeves axially to their first predetermined positions, and means for returning the moved shiftable element to its said one position as the sleeves are returned.

4. In a control mechanism for a change speed transmission having shiftable elements for controlling the speed ratios, an inner rotatable and axially slidable sleeve, a shorter outer sleeve mounted on the inner sleeve for rotation therewith and relative axial sliding movement thereto, means for axially moving the sleeves simultaneously in opposite directions from and to predetermined positions, two spring pressed elements carried by each shiftable element, a recess in each sleeve for receiving an element, said recesses being so arranged circumferentially that any element can be selectively received in its recess by a rotation of the sleeves when said sleeves are in one of their predetermined positions, and means for rotating the sleeves.

5. In control mechanism for a change speed transmission having shiftable elements for controlling the speed ratios, concentric sleeves mounted for relative axial sliding movement and simultaneous rotation, means comprising plungers carried by the shiftable elements and cooperating recesses in the sleeves for selectively connecting the elements with the sleeves for axial movement therewith and by a rotation of the sleeves when said sleeves are in predetermined axial positions, means for simultaneously moving the sleeves axially in opposite direction from and to the predetermined positions, and means for returning the shiftable elements with the sleeves when said sleeves are returned to the predetermined positions and comprising the plungers which are arranged to cooperate with the inner sleeve.

6. In control mechanism for a change speed transmission having shiftable elements for controlling the speed ratios, concentric sleeves mounted for relative axial sliding movement and for simultaneous rotation, the inner of said sleeves being longer than the outer and provided with a collar, two spring biased plungers carried by each shiftable element, one of which cooperates with the outer sleeve and the other with the inner sleeve, recesses in the sleeves for the plungers so arranged that when the sleeves are in predetermined positions the plungers can be caused to selectively enter their individual cooperating recesses by a rotation of the sleeves, means for moving the sleeves simultaneously outwardly from the predetermined positions to thereby move a connected shiftable element therewith to an operative position, and means for simultaneously returning the sleeves to their predetermined positions, said plungers which cooperate with the inner sleeve being so related to the end of the outer sleeve and the collar on the inner sleeve that when a shiftable element is in an operative position it will be moved therefrom by the return movement of the sleeves.

7. In a control mechanism for a change speed transmission having shiftable elements for controlling the speed ratios, concentric sleeves mounted for relative axial sliding movement and simultaneous rotation, means for simultaneously moving the sleeves axially in opposite directions to predetermined positions away from and toward each other, the inner sleeve being so related to the outer sleeve that it will have an exposed cylindrical surface when the sleeves are at their inner predetermined positions, means for selectively connecting the shiftable elements to each sleeve by a rotation of the sleeves when in their inner predetermined positions so that the sleeves can move the shiftable elements in opposite directions from a central position and comprising spring biased plungers carried by the shiftable elements and cooperating recesses in the sleeves, means for moving the shiftable elements back to their central position regardless of the rotative position of the sleeves when the sleeves are returned to their inner positions and comprising an annular shoulder on the inner sleeve, the inner end of the outer sleeve and means carried by the shiftable elements, and means for rotating the sleeves.

8. In a control mechanism for a change speed transmission having shiftable elements for controlling the speed ratios, concentric sleeves mounted for relative axial sliding movement and simultaneous rotation, means for simultaneously moving the sleeves axially in opposite directions to predetermined positions away from and toward each other, the inner sleeve being so related to the outer sleeve that it will have an exposed cylindrical surface when the sleeves are at their inner predetermined positions, means for selectively connecting the shiftable elements to each sleeve by a rotation of the sleeves when in their inner predetermined positions so that the sleeves can move the shiftable elements in opposite directions from a central position, means for moving the shiftable elements back to their central position regardless of the rotative position of the sleeves when the sleeves are returned to their inner positions and comprising an annular shoulder on the inner sleeve, the inner end of the outer sleeve and means carried by the shiftable elements, and means for rotating the sleeves.

9. In a control mechanism for a change speed transmission having a shiftable element, simultaneously rotatable and axially shiftable telescopically arranged members, means for simultaneously moving the members in opposite axial directions to predetermined positions away from and toward each other, means comprising spring pressed plungers carried by the shiftable element and recesses in the members for selectively connecting the elements to the members by a rotation of said members when in their inner predetermined position so that the members can move the element in opposite directions from a central position when the members are moved to their outer predetermined positions, means comprising means carried by the shiftable element, a cooperating shoulder means on the inner one of the members and an end face of the outer of said members for moving the element back to the central position when the members are returned to their inner predetermined position and regardless of the rotative position of the members, and means for rotating the members.

10. In a selecting and shifting mechanism for a change speed transmission having shiftable elements, a rotatable and slidable sleeve having a full cylindrical surface provided with circumferentially arranged recesses in its surface, a tubular bushing carried by each shiftable element and extending to adjacent the sleeve surface, a spring pressed plunger slidable in each tubular bushing for cooperating with the recesses to selectively connect the elements to the sleeve when in a predetermined axial position, means for moving the sleeve axially from the predetermined position to a second predetermined position to thereby move a shiftable element therewith when connected thereto, means for returning the sleeve to the first predetermined position, means for moving a previously moved shiftable element with the sleeve during its return movement regardless of the rotative position of said sleeve and comprising an annular shoulder on the sleeve adjacent the recesses for cooperation with the extending end of the tubular bushings, and means for rotating the sleeve.

11. In transmission control mechanism, a shifting element, spring actuated coupling plungers carried thereby, rotatable selectors comprising telescoped full cylindrical sleeves each provided with sockets, each of said sleeves forming a solid cylindrical surface upon which said plungers ride when not selectively engaged in a socket, means for relatively shifting the selectors axially to positions where said plungers can be selectively received in cooperating sockets, and means for simultaneously rotating said selectors.

12. In change speed gearing control mechanism, telescopically arranged selector sleeves having full cylindrical surfaces and each of which is provided with sockets therein, a shifting element, spaced coupling members carried by said shifting element, means for relatively moving the selector sleeves to positions where the sockets of each sleeve can selectively receive a cooperating coupling member upon rotation of the sleeves, means for rotating the sleeves, and means for simultaneously moving the sleeves axially in opposite directions for causing shifting of a connected shifting element.

13. In a change speed gearing control mechanism, telescopically arranged selector sleeves each provided with sockets in its cylindrical surface, a shifting element, spring biased coupling plungers carried by the shifting element and arranged to ride on the cylindrical surfaces except when received in a socket, means for relatively moving said sleeves to inner positions locating the sockets for selective reception with cooperating plungers when the sleeves are rotated, means simultaneously rotating the sleeves, and means for moving said sleeves simultaneously outwardly in opposite directions for effecting the shifting of a connected shifting element.

14. In a change speed gearing control mechanism, telescopically arranged selector sleeves having full cylindrical surfaces and each of which is provided with sockets therein, a shifting element, spaced coupling members carried by said shifting element, means for relatively moving the selector sleeves to positions where the sockets of each sleeve can selectively receive a cooperating coupling member upon rotation of the sleeves, means for rotating the sleeves, means for simultaneously moving the sleeves axially in opposite directions for causing shifting of a connected shifting element, and means carried by the sleeves for engaging a coupling member and returning a shifting element when the sleeves are returned to the positions where there can be selective reception of the plungers and notwithstanding the sleeves are in a rotative position where no coupling member is received in a socket.

GLENN T. RANDOL.

REFERENCES CITED

The following references are of record in the file of this patent:

UNITED STATES PATENTS

| Number | Name | Date |
| --- | --- | --- |
| 2,193,432 | Randol | Mar. 12, 1940 |